United States Patent [19]

Van Haren

[11] Patent Number: 5,083,507
[45] Date of Patent: Jan. 28, 1992

[54] DEVICE FOR PUMPING MEAT-CONTAINING PRODUCTS

[75] Inventor: Lambertus F. W. Van Haren, Druten, Netherlands

[73] Assignee: Stork Protecon B.V., Utrecht, Netherlands

[21] Appl. No.: 416,544

[22] Filed: Oct. 3, 1989

[30] Foreign Application Priority Data

Oct. 5, 1988 [NL] Netherlands .................. 8802443

[51] Int. Cl.$^5$ .................. A22C 11/06; A22C 17/00
[52] U.S. Cl. .................. 99/472; 99/467; 222/152; 222/270; 222/380; 366/139; 452/40; 452/43
[58] Field of Search .................. 99/467, 472, 348, 471, 99/477; 366/139, 77, 192, 193; 426/486; 452/31, 36, 41, 43, 40; 222/152, 269, 270, 275, 249, 250, 256, 380

[56] References Cited

U.S. PATENT DOCUMENTS

| | | | |
|---|---|---|---|
| 2,805,444 | 9/1957 | Hensgen et al. | 452/43 |
| 2,963,735 | 12/1960 | Gaudlitz | 452/41 |
| 3,802,333 | 4/1974 | Barber-Percz et al. | 99/472 |
| 3,814,289 | 6/1974 | Robbins | 222/275 |
| 3,908,537 | 9/1975 | Bajcar et al. | 99/472 |
| 4,032,049 | 6/1977 | Roberts | 99/472 |
| 4,322,023 | 3/1982 | Olson | 222/380 |
| 4,382,404 | 5/1983 | Hawley et al. | 99/348 |
| 4,700,899 | 10/1987 | Powers et al. | 428/486 |
| 4,747,342 | 5/1988 | Schack et al. | 99/467 |
| 4,902,522 | 2/1990 | Rudibaugh | 99/472 |

Primary Examiner—Timothy F. Simone
Attorney, Agent, or Firm—Harness, Dickey & Pierce

[57] ABSTRACT

In a device for pumping meat-containing products, such as pieces of meat, meat paste and meat pulp (dough), it is aimed at avoiding problems of the meat forming bridges in a feed space, of meat remaining in the device during a too long time, of too much churning up of the meat and to provide a simple device adapted to discharge at will a continuous meat discharge flow under constant pressure or at a constant flow rate. Thereto, there is a feed space with means for feeding the meat under pressure to one of a number of cylinders with reciprocating pistons or the like, acting in parallel, with a controlled valve in the delivery line between each piston and a common discharge duct. Several feed means are proposed, depending on the application of the devices for pieces of meat on the one hand or for paste or pulp.

17 Claims, 4 Drawing Sheets

DEVICE FOR PUMPING MEAT-CONTAINING PRODUCTS

BACKGROUND OF THE INVENTION

The invention relates to a device for pumping meat-containing products, such as pieces of meat, meat paste and meat pulp (dough), in an essentially uniform stream, having a number of displacers such as pistons, which alternate during the pumping.

Such meat pumps are used to pump the meat to systems where further operations are carried out, for example making sausage, meat metering to all kinds of casings, for example for hams, checking of the meat for, for example, pieces of bone and other characteristics etc.

Meat paste and meat pulp constitute a fairly uniform mass with at most very small cohering original meat particles (in any case less than 1 cm maximum transverse measurement) and can be obtained by grinding or cutting and, for example, from bone presses, in which (remaining) meat with bones is placed under high pressure in order for the meat to be separated from the bones and leave the press through fine holes as a paste.

Devices for pumping meat are known in various designs. For example, rotary vane pumps for meat are known, to which the meat is fed from a feed hopper via a worm screw under vacuum, something which is suitable only for pieces of meat. Meat pulp and meat paste have the tendency to tunnel formation, in other words, meat which is at a standstill for some time, here for example above the worm screw, does not move downwardly very well or not at all, for example into the range of the screw, and thus forms a bridge.

Devices of the type referred to in the preamble, with alternating displacers, have become known, inter alia in order to eliminate the disadvantage of such tunnel formation.

For example, meat pumps are known in which a reciprocating displacer forces a stream of meat product batchwise towards an outlet, at which outlet is connected a second displacer which moves back to allow its delivery space to be filled by the first displacer when the latter is pressing, while the second displacer empties its thus filled delivery space while pressing towards the outlet when the first displacer is moving back. A disc-shaped non-return valve between said delivery spaces makes this possible. The meat is greatly churned up in the process, particularly by the first displacer when it is moving back into the feed space, and in this case some of the meat can easily remain too long in the feed space.

Meat pumps with two parallel reciprocating displacers in the bottom of a feed space are also known, connecting to a common outlet, while at the place where the outlets of the two displacers meet to form a common outlet a reversing valve moving under the influence of the pressure of the meat is provided. In order to ensure that the displacers are capable of forcing the meat towards the outlet under a desired pressure, each displacer has a cylinder which encloses it tightly, and which is also reciprocatable for the purpose of being moved between a retracted position, in which it is retracted from the feed space at the side opposite the outlet, and an extended position, in which it is entirely positioned in the bottom part of the feed space and connects to the appropriate outlet. When each displacer is retracted away from the meat outlet, its cylinder moves with it. On the delivery stroke the cylinder first moves to the extended position, following which the displacer can put pressure on the meat mass taken up therein by the cylinder on that movement, and which is separated from the rest of the feed space, and can force it towards the meat outlet.

The cylinder with sharp front edge makes this system unsuitable for pieces of meat, while the cylinder each time the meat above it at a standstill for so long that the above-mentioned tunnel formation occurs in the case of meat paste and meat pulp, so that it does not sink down again quickly and completely when the cylinder is retracted.

The object of the invention now is to improve this and to provide a device of the type referred to in the preamble, suitable not only for pieces of meat but also for meat paste and meat pulp, in which the above-mentioned disadvantages do not occur, a uniform meat flow through the device and to the outlet can be achieved, and the residence time of all meat in the device is approximately equally short.

SUMMARY OF THE INVENTION

For this purpose, such a device is according to the invention characterized in that a feed space for the meat product connects to at least two reciprocating displacers or pistons disposed outside it and acting in parallel, in that at least one further moving pressurizing piston is disposed in said feed space in order to place the meat product under pressure, in such a way that it can flow towards each cylinder of said displacers acting in parallel when the latter in their reciprocating movement free the connection to the feed space, and in that a controlled valve is fitted in the delivery line between each of said cylinders and a common discharge line.

Said pressurizing means need not obstruct the sinking down of the meat in the feed space, and can easily work in such a way that no meat is left too long in the feed space and that the meat is not churned up too much. Since the above-mentioned valve in the outlet is controlled, it can be given a much better shape for the purpose than a non-return valve operating through pressure, which gives a troublesome disruption of a uniform through-going meat flow, particularly at the downstream side.

The connections of the feed space to said cylinders are preferably fitted in the side wall of said cylinders, in such a way that each displacer passes its connection on its reciprocating movement. The cylinders can thus be filled from the side, which permits an advantageous positioning of said displacers to the side of the feed space and allows a simple design of the said pressurizing means in the feed space. Said pressurizing means is according to the invention preferably a single reciprocating double-acting piston which can move from the connection of one of the parallel-acting displacers to the connection of the other one for the infeed of meat product alternately to one and the other of these displacers. Such a piston can move fairly quickly and need be moved only during a small part of the total pumping cycle, so that no tunnel formation occurs in the feed space and the meat always sinks down well for filling of the space in which this piston is operating.

The invention makes it possible in a simple manner to use the device as desired for the supply of a constant meat output or for the delivery of a meat product at constant pressure, as will be described below.

The invention also relates to measures which are intended for improving the use of the device either for pieces of meat, or for meat paste and pulp.

BRIEF DESCRIPTION OF THE DRAWINGS

The invention will now be explained in greater detail with reference to the appended drawings, in which.

DETAILED DESCRIPTION OF THE PREFERRED EMBODIMENTS

Figure 1:
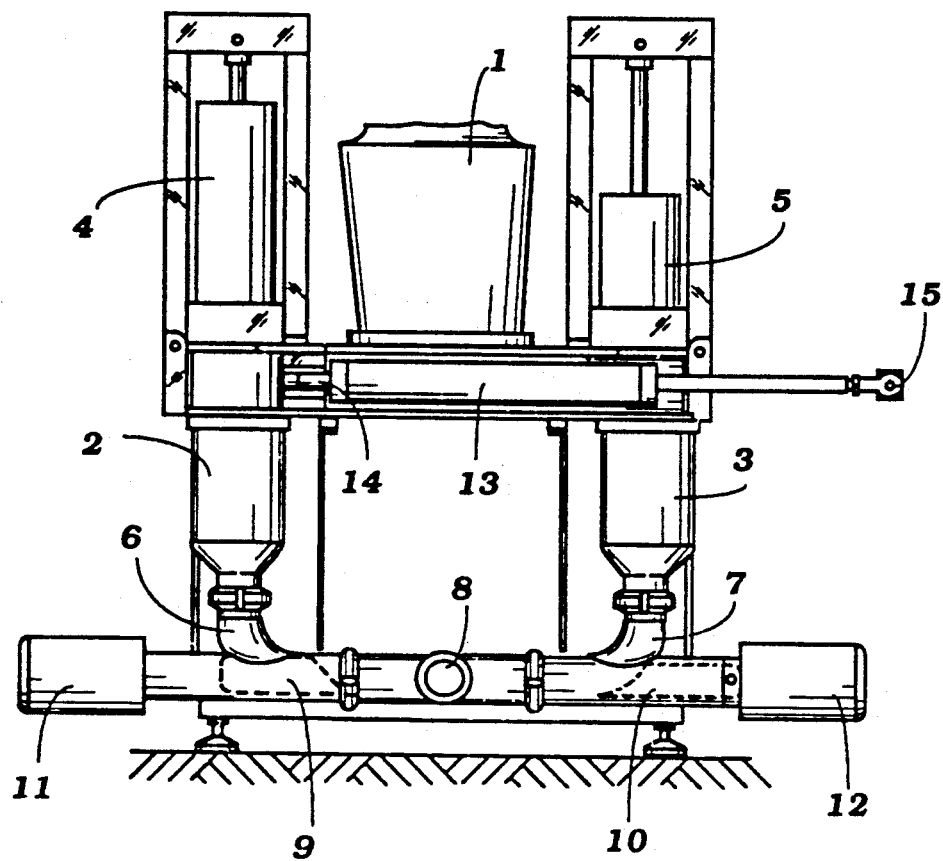
FIG. 1 is a side view of a device according to the invention in a preferred embodiment.

In a frame there is a meat feed space 1, having on two opposite sides thereof an upright cylinder 2, 3, each with a displacer 4 and 5 respectively, fitting therein, and an outlet line 6 and 7 respectively at the bottom of each cylinder, meeting in a common outlet 8. Each outlet line contains a valve 9 and 10 respectively, shown in dotted lines, and each operated by a pneumatic cylinder 11, 12.

Two horizontal pneumatic cylinders 13 engage at 14 on a fixed point in the frame and at the other side engage with their moving part a yoke 5 on which two horizontal rods 16 extend through sliding stuffing boxes into the bottom part of the feed space 1, where they are connected to a piston 17.

Figure 2:
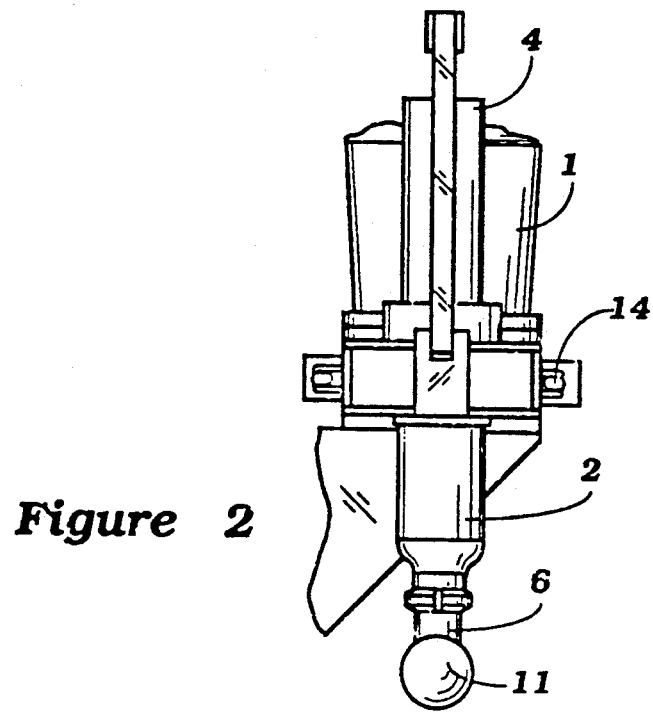
FIG. 2 is an end view.
Figure 3:
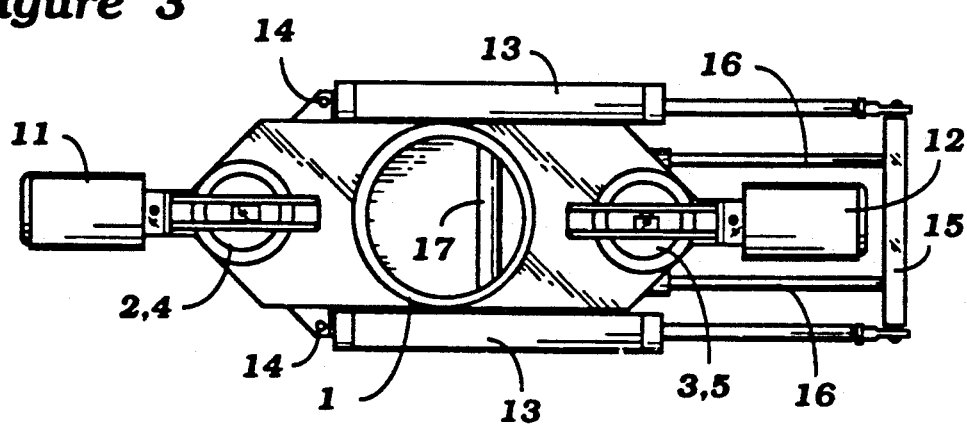
FIG. 3 is a top view of said device.

In FIGS. 1 and 2 the feed space at the top end is not shown in detail. Depending on the purpose, a feed device according to FIG. 7 or according to FIG. 8 can connect thereto, as will be discussed in greater detail. In FIG. 3 the top part of the feed space is left out, so that said piston 17 is largely visible.

Figure 4:
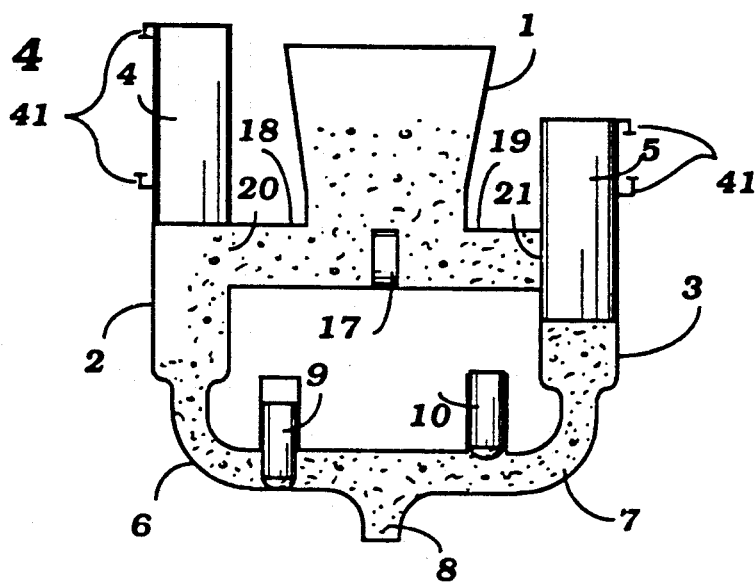
FIG. 4 is a schematic illustration of the situation during pumping.
Figure 5:
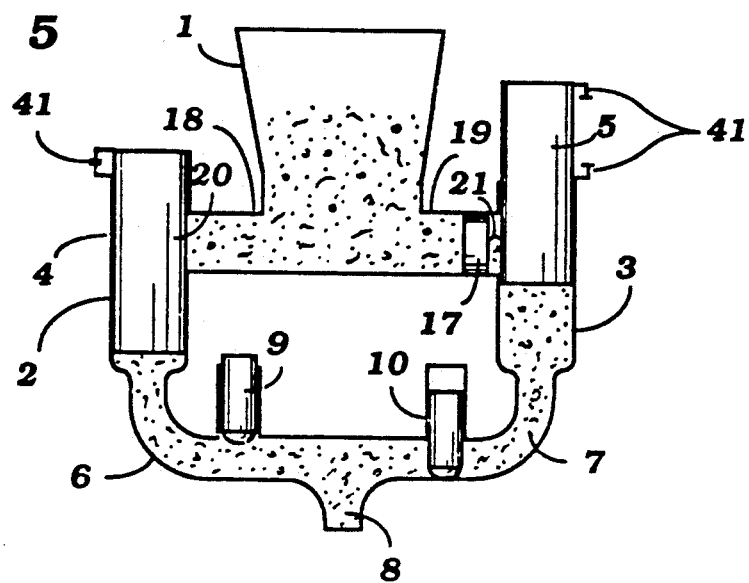
FIG. 5 is such an illustration in a different phase thereof.

FIGS. 4 and 5 show how the feed space 1 is connected internally to the space inside the cylinders 2 and 3 by horizontal cylinder parts 18 and 19 in which piston 17 fits, part 18 connecting to an opening 20 in the side wall of cylinder 2, and part 19 connecting to such an opening 21 of cylinder 3.

This device operates as follows: As shown in FIG. 4, the displacer 5 is moving downwards at a particular moment, and the valve 10 is open to allow the meat thus displaced through to outlet 8. Displacer 4, which in principle moves in opposing phase to displacer 5, is in its highest position, and valve 9 is closed. Meat placed in the feed space 1 is now conveyed by piston 17 to cylinder 2, so that the latter is filled. Piston 17 is shown in the centre position here. The pneumatic cylinders 13 give the piston 17 a variable end position in both directions, so that after complete filling of cylinder 2 and the exertion of a certain pressure thereon by piston 17 the latter stops. This ensures as well as possible that the cylinders 2 and 3 are filled completely.

The piston 17 preferably has a larger surface area than the pressure face of the displacers 4 and 5. In the figures the piston 17 is presumed to be non-circular, lower than wide. The rods 16 can thus run along the cylinder 3 at the side. The shape of the cylinder parts 18 and 19 is, of course, adapted thereto.

Before displacer 5 has reached the end of its downward delivery stroke, displacer 4 is moved quickly downwards under a pressure which is lower than the delivery pressure, until it just shuts off opening 20 or has slightly passed it, with a variable end position determined by said pressure. This means that there is more certainty that the space in cylinder 2 is completely filled. Said lower pressure is higher than the pressure which piston 17 exerts, so that some meat can be forced back into space 18 if desired.

Once displacer 5 approaches its downward pressing end positions, this is observed by one or more sensors 41 and passed on to the control system, which now quickly closes valve 10, quickly opens valve 9 and makes displacer 4 more further downwards at a higher pressure, the delivery pressure, for pressing, while displacer 5 moves quickly upwards. Once this displacer 5 is reaching its top end position, piston 17 is moved quickly to the right for the filling of cylinder 3, following which displacer 5 is moved downwards to shut off the connection opening 21, as discussed for displacer 4. The moving parts now take up the position shown in FIG. 5. Since displacer 5 can then start its delivery stroke as soon as displacer 4 has reached the end of its delivery stroke, a virtually continuous meat flow can be obtained through the outlet 8.

If one now wishes to pump the meat with constant output (quantity per unit time), one makes the displacers 4 and 5 carry out a uniform movement (of constant speed) during the pumping, irrespective of the delivery pressure. If a practically uniform delivery pressure is desired, one ensures that a constant downward pressure is exerted by said displacers during their delivery stroke. All this is easy to achieve with a hydraulic drive of the displacers 4 and 5, where either a constant quantity of liquid can be taken into a hydraulic drive cylinder or liquid under constant pressure with a quantity per unit time which adjusts itself thereto. Since the displacers must move back quickly and, before forcing, first have to move in the delivery direction under a lower pressure to shut off the connection openings 20 and 21, two hydraulic drives can advantageously be selected for this, with rapid reversing and with mutually differing pressures.

Figure 6:
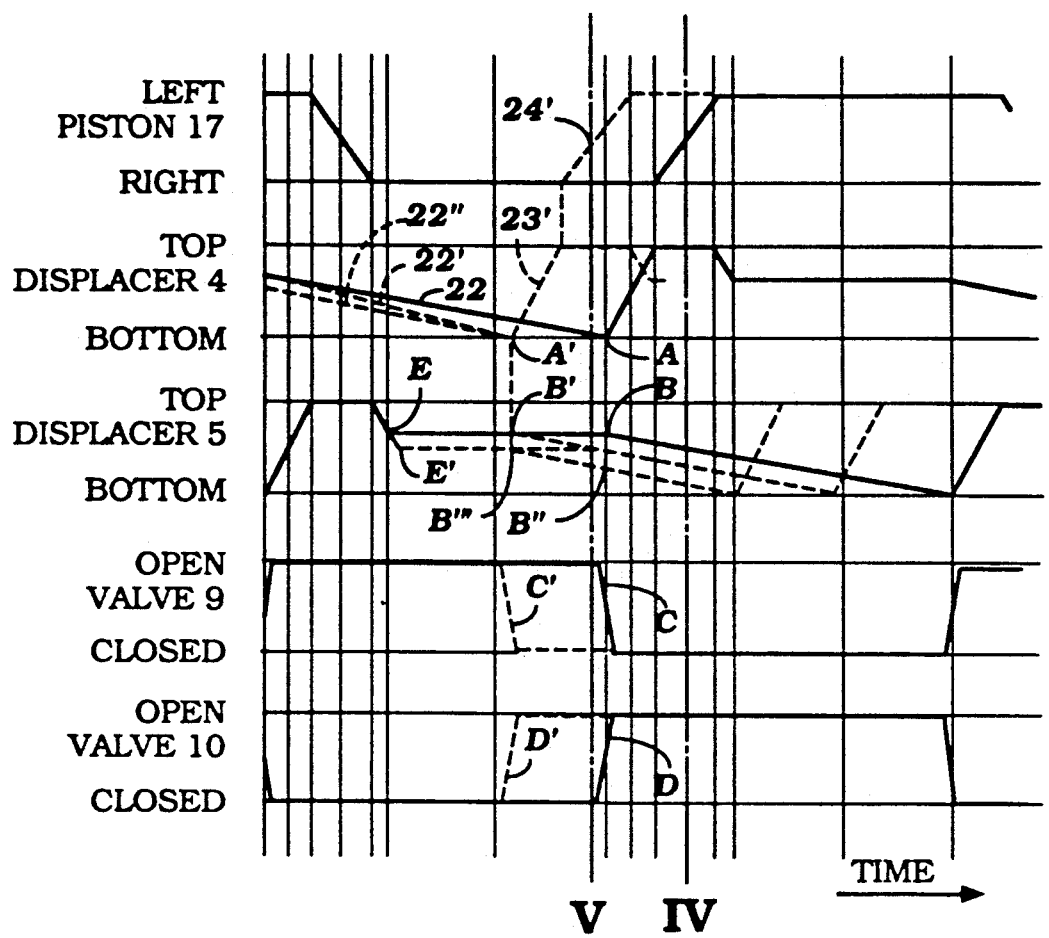
FIG. 6 is a circuit diagram, showing the relationship between the positions of the different moving elements of said device and time.

FIG. 6 shows the relative movement of the parts. The time in seconds is plotted on the horizontal axis, and the vertical axis shows the stroke of each of these parts individually. The solid lines show here the situation in which piston 17 always reaches the same end positions and stops there, and in which the displacers 4 and 5 always reach the same position on closing of the connection openings 20 and 21, and move uniformly on the delivery stroke. At the bottom of FIG. 6 numbers IV and V indicate what situation corresponds to the position of the parts of FIG. 4 and 5 (in which, because the situation of FIG. 4 is reached earlier than that of FIG. 5, FIG. 5 actually belongs to a subsequent cycle).

The system works in such a way that the delivery stroke of a displacer begins immediately when that of the other displacer ends, in order to obtain a continuous delivery flow. All other movements are made subordinate thereto in their phasing. FIG. 6 assumes a normal cycle of 22 seconds, in which, for example, 3,000 dm$^3$ of meat per hour is pumped. There are various causes through which the phasing shown can change. If pumping takes place at constant delivery pressure, then a displacer 4 or 5 can follow a line different from the straight slanting line 22 for the uniform movement of displacer 4 and thus reach its end position slightly earlier or later.

Moreover, in the event of (for example, temporarily) insufficient meat in the feed space 1, the filling of a cylinder 2 or 3 can be incomplete, so that a displacer 4 or 5 moves slightly further down when closing its connection opening 20 or 21, and before the delivery stroke begins. The meat can also show differences in compressibility, which influence this initial position of the pressing. The system described will, however, always react well to this. FIG. 6 shows by dotted lines (and exaggerated for the sake of simplicity) what then happens. Assume that displacer 4 does not move along solid line 22 for the delivery stroke, but along line 22' or 22', and its delivery stroke ends in A' instead of in A. Then said displacer is quickly retracted along 23', and piston 17 begins on its next filling stroke along 24', while displacer 5 presses from B' instead of B and the valves 9 and 10 close and open respectively according to C' and D', instead of according to C and D.

For displacer 5 it is indicated how the latter can reach the start of the delivery stroke in E' instead of in E, and so has left a shorter delivery stroke. It then begins to press in B' when displacer 4 has followed the solid line and in B' when displacer 4 has followed the dotted line discussed. During that shorter delivery stroke displacer 4 starts to press earlier etc. Since each displacer has a fairly long standstill period after the closure of its connection opening (the horizontal line parts of 10 seconds when running along the solid lines), there is no objection to shortening thereof through such circumstances (for example, to the distance E–B' or E'–B').

The feed system will now be described with reference to FIGS. 7 and 8. A partial vacuum is maintained in known manner in the feed space 1 for the purpose of extracting the air from the meat, preventing the meat from being adversely affected through lengthy contact with air, preventing the appearance of the meat from being adversely affected, for example through air bubbles in sausages, and preventing too much air from being released during heating of, for example, sausages, which could break the skin.

Figure 7:
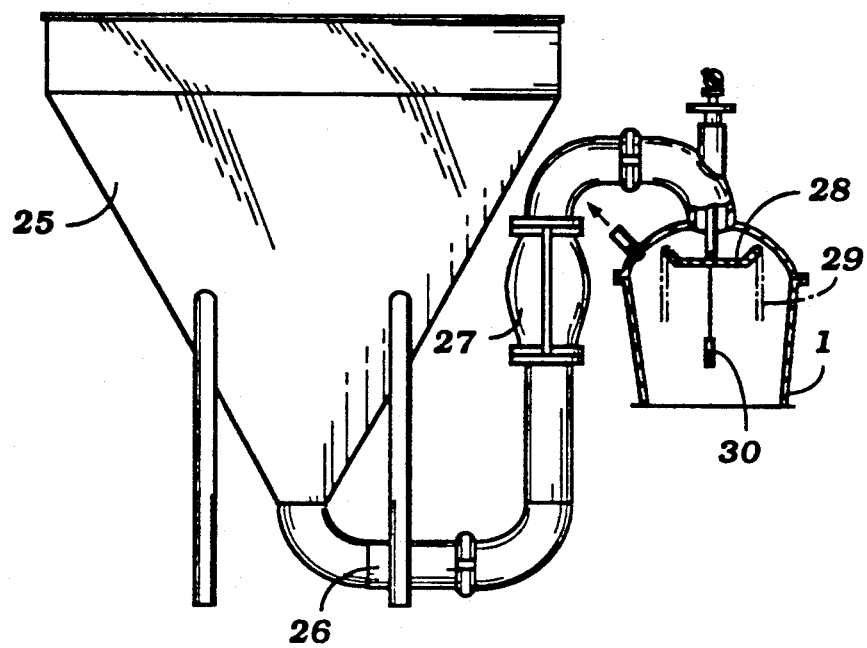
FIG. 7 shows the feed part of the device if used for meat paste or pulp.

FIG. 7 shows a feed hopper 25 for meat pulp or meat paste, from the bottom end of which a pipe 26 leads to a valve 27 and from there to the feed hopper 1 of the pumping device described. The valve 27 preferably has in the fixed housing a tubular diaphragm with connection for a pressure medium in the space between housing and diaphragm. Through infeed of said pressure medium, for example at a pressure of 5 bars, the diaphragm can be pinched together elastically and the valve can thus be closed. If it is open, the partial vacuum in the feed space 1 sucks in the meat pulp or the meat paste from the hopper 25. In the top of the feed hopper 1 is a dish 28 which leaves a gap free between its peripheral edge and the top wall of the space round the feed opening from pipe 26, through which meat pulp or meat paste flows in and moves downwards therein as a cylindrical screen 29. This thin screen gives good air extraction from the pulp or paste in this space which is under partial vacuum. The gap can be accurately set by moving the dish 28 up or down, for example by hand. A level sensor 30 observes the meat level in space 1. If this becomes too high, the height of the meat screen 29 becomes too small and air extraction is no longer adequate. Sensor 30 therefore closes valve 27 before this meat level becomes too high. The feed space 1 is the same as that of the preceding figures.

Figure 8:
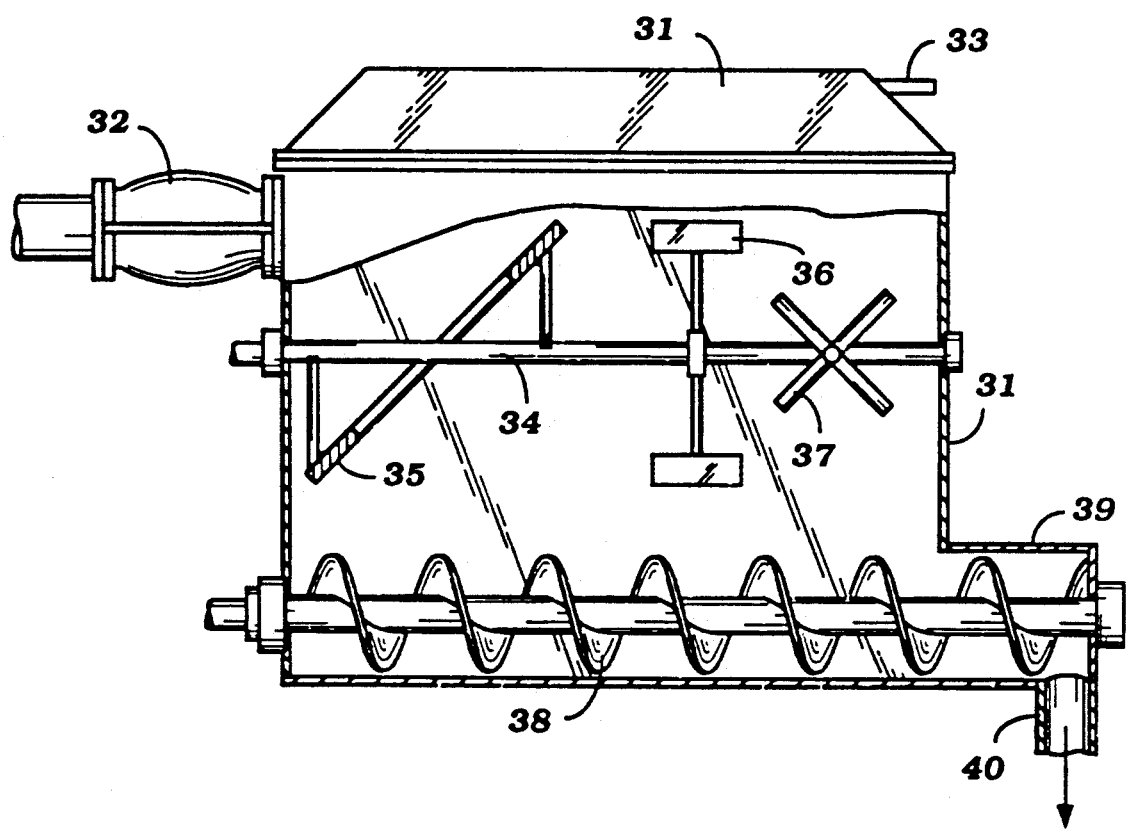
FIG. 8 shows said feed part in a different design, intended for pumping pieces of meat.

FIG. 8 shows a feed hopper 31 for pieces of meat. By means of a valve 32, which can be of the same design as valve 27 of FIG. 7, but in which the feed of pressure medium thereto can be controlled in any desired manner, for example by hand, the pieces of meat are fed to the hopper 31. This hopper is under partial vacuum (pipe 33 to vacuum pump), and the meat is thus easily sucked in when valve 32 is open.

The hopper 1 contains a shaft 34 having thereon stirring elements 35 to keep the meat moving slightly, so that it is deaerated well through the vacuum prevailing, without being damaged. There is great freedom in the choice of these stirring elements, for example as a flat slanting ring 35, as blades 36 parallel to or slanting relative to the shaft and at a distance from it, as slanting blades 37 directly on the shaft etc. and in all possible combinations thereof, as known in many different designs.

Located thereunder is a rotating conveyor screw 38 in a bottom part of the hopper 31, which encloses said screw in a close fit along the bottom half of the periphery. This screw conveys to the right in the figure and at the right end extends to the outside of the hopper 31 over a short distance into a part 39 which is built onto the hopper and encloses the screw along the entire periphery. In the bottom of part 39 there is a delivery opening 40 which connects to the feed space 1 of FIGS. 1–5. Said feed space can thus be fairly small. Sensors can be fitted to stop the screw 38 when the feed space 1 behind it is full, which is possible in all kinds of ways, for example by observing the resistance of screw 38, the latter then going into operation again for example after a fixed time lag or under the influence of a level measurement in the feed space. The valve 32 can also be connected to this control system, for example to be closed if screw 38 stops.

If the feed space 1 is shaped in such a way that the meat from opening 40 can reach the connection openings to the displacers, for example 20 and 21, in a supple and flowing way, then piston 17 can be omitted, and the screw 38 can take over its function.

I claim:

1. A device for pumping meat-containing products, such as pieces of meat, meat paste or meat pulp (dough), in an essentially uniform stream, comprising a feed space for the meat product, at least two cylinders each having a side wall wherein a connection to the feed space is formed, at least two reciprocating pistons, one associated with each of the cylinders, which alternate during the pumping and which act in parallel, at least one moving pressurizing means in the feed space for placing the meat product under pressure for feeding it to the cylinder connections, wherein each piston passes its associated cylinder connection on its reciprocating movement to control the opening and closing of its associated cylinder connection by closing its associated cylinder connection during a first part of its reciprocating movement in a first direction so as to keep its associated cylinder connection closed during the remainder of its movement in the first direction and to open its associated cylinder connection during its movement in a second direction opposite said first direction, said device further comprising a delivery line downstream of each of the cylinders joining to form a common discharge line, and a controlled valve between each of the cylinders and the common discharge line.

2. The device according to claim 1, further comprising a cylindrical tubular part between each of the connections and the feed space in which the moving pressurizing means is provided, the moving pressurizing means including a piston movable from the feed space towards at least one of the connections in a sliding fit in the tubular part.

3. The device according to claim 1, further comprising in-line tubular parts, one associated with each cylinder, in which the moving pressurizing means is provided, the moving pressurizing means including a single reciprocating double-acting piston moveable through the feed space between the connections for the infeed of meat product alternately to one and the other of the cylinders.

4. The device according to claim 2, wherein the piston of the moving pressurizing means is driven in such a way that it can stop in a variable end position in the tubular part depending on the counter pressure acting on the piston of the moving pressurizing means through the meat product being displaced by the piston of the moving pressurizing means.

5. The device according to claim 1, further comprising at least two controlled valves, one fitted in each delivery line and positioned upstream of the connection of its associated delivery line to the common discharge line.

6. The device according to claim 1 for the pumping of meat products in an essentially constant quantity per unit time, in which a drive of the parallel-acting pistons is designed in such a way that it drives the pistons at constant speed.

7. The device according to claim 1 for the pumping of meat products under essentially constant pressure, in which a drive of the parallel-acting pistons is designed in such a way that during the delivery stroke of the pistons they exert an essentially constant pressure on the meat.

8. The device according to claim 1, further comprising at least one sensor for observing that the parallel-acting pistons reach the end of their delivery strokes and connected to means for driving the pistons such that the delivery stroke of one piston starts as soon as the other piston reaches the end of its delivery stroke, and for making the controlled valve open and close in a pattern adapted to the movement of the pistons.

9. The device according to claim 8, in which the moving pressurizing means in the feed space is connected to means for reversing the movement of the moving pressurizing means at a moment determined under the influence of the sensor.

10. The device according to claim 2, in which drive means for the parallel-acting pistons makes one of the parallel-acting pistons move back quickly after it delivers meat product to the corresponding delivery line to open its associated cylinder connection, then, after a time lag on account of the necessary filling time, makes that same piston move in the delivery direction to close its associated cylinder connection, and thereafter holds that same piston still until the delivery stroke of the other parallel-acting piston has ended and the controlled valve can be opened and the delivery stroke can be begun.

11. The device according to claim 10, in which the drive means for the parallel-acting pistons are designed in such a way that at the point of standstill of one of the parallel-acting pistons when its associated cylinder connection is closed a certain pressure is maintained on the meat, which determines the standstill position.

12. The device according to claim 1 for pumping meat pulp or meat paste, further comprising means for placing the feed space under reduced pressure, a level meter for pulp or paste in the feed space, and a dish valve at the top side of the feed space for making a thin layer of pulp or paste flow along the periphery of the dish valve into the feed space while the level meter controls the infeed of paste or pulp to the feed space.

13. The device according to claim 12, in which the dish valve is constantly open, and in which the control of the infeed of pulp or paste to the dish valve is carried out by a diaphragm valve.

14. The device according to claim 12, in which the dish valve is adjustable to set the size of the gap between the valve and a valve seat.

15. The device according to claim 1 for pumping pieces of meat, further comprising means for placing the meat in the feed space under reduced pressure, moving stirring elements, and a conveyor screw for conveying the meat to the cylinders.

16. The device according to claim 15, in which a drive of the conveyor screw has means for stopping if it encounters too much resistance through the device being completely filled downstream of the screw towards the cylinders.

17. The device according to claim 16, in which the conveyor screw is the moving pressurizing means for placing the meat product under pressure.

* * * * *